United States Patent
Sakamoto

(10) Patent No.: US 7,628,881 B2
(45) Date of Patent: Dec. 8, 2009

(54) MANUFACTURING METHOD OF RUBBER MEMBER FOR TIRE, AND PNEUMATIC TIRE

(75) Inventor: Masayuki Sakamoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 341 days.

(21) Appl. No.: 11/594,849

(22) Filed: Nov. 9, 2006

(65) Prior Publication Data
US 2007/0113942 A1   May 24, 2007

(30) Foreign Application Priority Data
Nov. 18, 2005  (JP) .............................. 2005-334753
Aug. 7, 2006   (JP) .............................. 2006-214780

(51) Int. Cl.
*B29D 30/00* (2006.01)
*B29D 30/52* (2006.01)
*B60C 11/00* (2006.01)

(52) U.S. Cl. ................. 156/110.1; 156/123; 156/128.1; 156/209.1; 156/450

(58) Field of Classification Search ............. 156/128.1; 152/450, 209.1
See application file for complete search history.

(56) References Cited

FOREIGN PATENT DOCUMENTS

| | | | |
|---|---|---|---|
| EP | 1607209 | * | 12/2005 |
| EP | 1 625 932 A2 | | 2/2006 |
| FR | 1523571 | * | 5/1968 |
| JP | 4-53735 | * | 2/1992 |
| JP | 5-329963 | * | 12/1993 |
| JP | 6-55659 | * | 3/1994 |
| JP | 2000-94542 A | | 4/2000 |
| JP | 2000-289122 A | | 10/2000 |
| JP | 2002-79590 A | | 3/2002 |
| JP | 2002-160508 A | | 6/2002 |
| JP | 2006-27010 | * | 2/2006 |
| LU | 42-649 A1 | | 11/1963 |
| WO | WO 2004/062887 | * | 1/2004 |

\* cited by examiner

*Primary Examiner*—Justin Fischer
(74) *Attorney, Agent, or Firm*—Birch, Stewart, Kolasch & Birch, LLP

(57) ABSTRACT

A manufacturing method of a rubber member for a tire includes a winding step in which a rubber strip is spirally winding and overlapping around a surface of a to-be wound body, thereby forming a tire rubber member around which the rubber strip is overlapped. A plurality of air-vent grooves are formed on at least one of surfaces of the rubber strip. Each air-vent groove extends at an angle θ of 20 to 90° with respect to the longitudinal direction of the rubber strip, the maximum groove width of the air-vent groove is 0.3 to 3.0 mm, and the maximum groove depth thereof is 0.1 to 3.0 mm.

8 Claims, 11 Drawing Sheets

MANUFACTURING METHOD OF RUBBER MEMBER FOR TIRE, AND PNEUMATIC TIRE

BACKGROUND OF THE INVENTION

1. Field of the Invention

The present invention relates to a manufacturing method of a rubber member for a tire forming a rubber member for a tire such as a tread rubber and a sidewall rubber by overlapping and spirally winding a rubber strip, and the invention also relates to a pneumatic tire which is vulcanized and formed using the rubber member.

2. Description of the Related Art

In a pneumatic tire, various portions require different characteristics and thus, the pneumatic tire is made of various rubber members having different composition and cross sectional shapes such as a tread rubber, a sidewall rubber, a clinch rubber, a belt cushion rubber and an inner liner rubber. Conventionally, each rubber member is formed in a raw tire forming step in such a manner that a wide extruded compact having a desired cross sectional shape extruded by a rubber extruder is wound once around a forming drum or the like.

In recent years, as shown in FIG. 11A, there is proposed a so-called strip winding system in which a ribbon rubber strip (a) is wound around a surface of a cylindrical to-be wound body (d) such as a forming drum while shifting the position of the to-be wound body in its axial direction (e.g., see Japanese Laid-open Patent Publication No. 2000-94542, Japanese Laid-open Patent Publication No. 2002-160508, and Japanese Laid-open Patent Publication No. 2002-79590). With this, a strip winding body (b) having almost desired cross sectional shape can be formed directly on the to-be wound body (d) as a rubber member (c). FIG. 11 show a case in which the rubber member (c) is a tread rubber. According to this strip winding system, it is unnecessary to keep the wide extruded compact as an intermediate stock. Thus, the tire manufacturing efficiency can be enhanced, and space can be saved. This system has great merit when the volume of production is low and there are a wide variety of tires to be manufactured.

When the rubber member (c) is formed by the strip winding system, however, a gap (e) is formed between the wound rubber strips (a, a), and between the rubber strip (a) and the to-be wound body (d) as shown in FIG. 11B on the enlarged scale. Therefore, after the vulcanizing formation, air is prone to remain in the gap (e), and quality of tire is deteriorated.

SUMMARY OF THE INVENTION

Based on a technique in which a plurality of air-vent grooves are arranged on a surface of a rubber strip at a predetermined angle, it is an object of the present invention to provide a manufacturing method of a rubber member for a tire capable of effectively preventing air from remaining in the gap while securing the merit of the strip winding system, and capable of maintaining high quality of tire. It is another object of the invention to provide a pneumatic tire.

To achieve the above object, the invention according to a first aspect provides a manufacturing method of a rubber member for a tire including a winding step of forming the rubber member in which a rubber strip is overlapped, by overlapping and spirally winding the rubber strip on a cylindrical to-be wound body while shifting the rubber strip from one side to the other side of the axial direction of the to-be wound body along with the rotation of the to-be wound body, wherein a plurality of air-vent grooves capable of discharging air between the overlapped rubber strips are arranged on at least one of surfaces of the rubber strip, and each of the air-vent grooves has an angle θ of 20 to 90° with respect to a longitudinal direction of the rubber strip, extends between side lines of the rubber strip, maximum width of the air-vent groove is 0.3 to 3.0 mm, and maximum depth of the air-vent groove is 0.1 to 3.0 mm.

Since the present invention has the above-described structure, it is possible to effectively reduce air remaining between the rubber strips and between the rubber strip and the forming drum while securing the merit of the strip winding system, and to maintain the high quality of the tire.

DETAILED DESCRIPTION OF THE PREFERRED EMBODIMENTS

An embodiment of the present invention will be explained together with illustrated examples.

Figure 1:
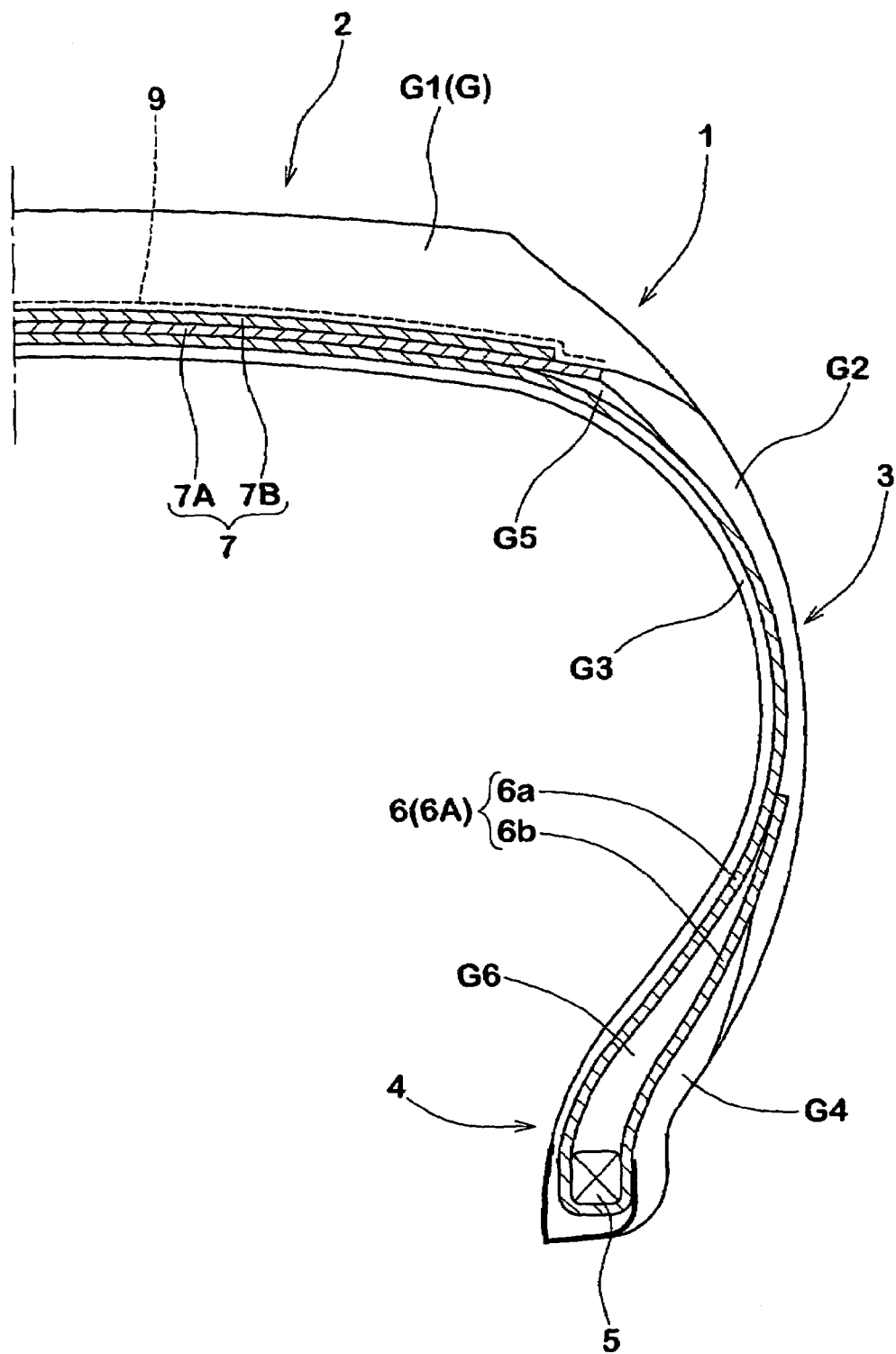
FIG. 1 is a sectional view showing an embodiment of a pneumatic tire using a tire rubber member manufactured by a manufacturing method of the present invention.

FIG. 1 is a sectional view showing one example of a pneumatic tire vulcanized and formed using a tire rubber member manufactured by the manufacturing method of the invention. In FIG. 1, a pneumatic tire 1 includes a plurality of kinds of tire rubber members G having different rubber compositions, and a cord reinforcing layer including a carcass 6 forming a skeletal frame of the tire and a belt 7 disposed radially outer side of the carcass 6.

The carcass 6 includes one or more (one, in this example) carcass ply 6A on which carcass cords are arranged at an angle of 70 to 90° with respect to a circumferential direction of the tire. In this example, the carcass ply 6A includes a ply main body 6a extending from the tread portion 2 to a bead core 5 of a bead portion 4 through the sidewall portion 3, and a ply folded-back portion 6b which is connected to both sides of the ply main body 6a and which is folded by around the bead core 5.

The belt 7 includes two or more (two, in this example) belt plies 7A and 7B arranged at an angle of 10 to 35° with respect to the tire circumferential direction. According to the belt 7, the belt cords intersect between the plies and thus, the belt rigidity is enhanced and the tread portion 2 is strongly reinforced. The belt 7 can be provided with a band 9 in which the band cord is arranged along the tire circumferential direction to enhance the high speed running performance.

Next, the tire rubber member G includes a tread rubber G1, a sidewall rubber G2, an inner liner rubber G3, a clinch rubber G4, a belt cushion rubber G5 and a bead apex rubber G6. The tread rubber G1 is disposed in the tread portion 2, and forms a ground-contact surface. The sidewall rubber G2 is disposed in the sidewall portion 3 and forms an outer side surface of the tire. The inner liner rubber G3 is disposed inside of the carcass 6 and forms the tire cavity surface. The clinch rubber G4 is disposed in the bead portion 4, forms an outer surface of the bead and prevents the rim from being deviated. The belt cushion rubber G5 is disposed between both ends of the belt 7 and the carcass 6, and protects an outer end of the belt. The bead apex rubber G6 extends radially outward from the bead core 5, and reinforces the bead portion 4.

At least one of the tire rubber members G1 to G6 is formed by the strip winding system. In the strip winding system, as shown in FIG. 2, an unvulcanized rubber strip 10 is spirally wound and overlapped around a surface of the cylindrical to-be wound body 30 while shifting the rubber strip from one side to the other side of the axial direction of the to-be wound body together with rotation of the to-be wound body 30, thereby forming the tire rubber member G as a winding body of the rubber strip 10.

Figure 2:
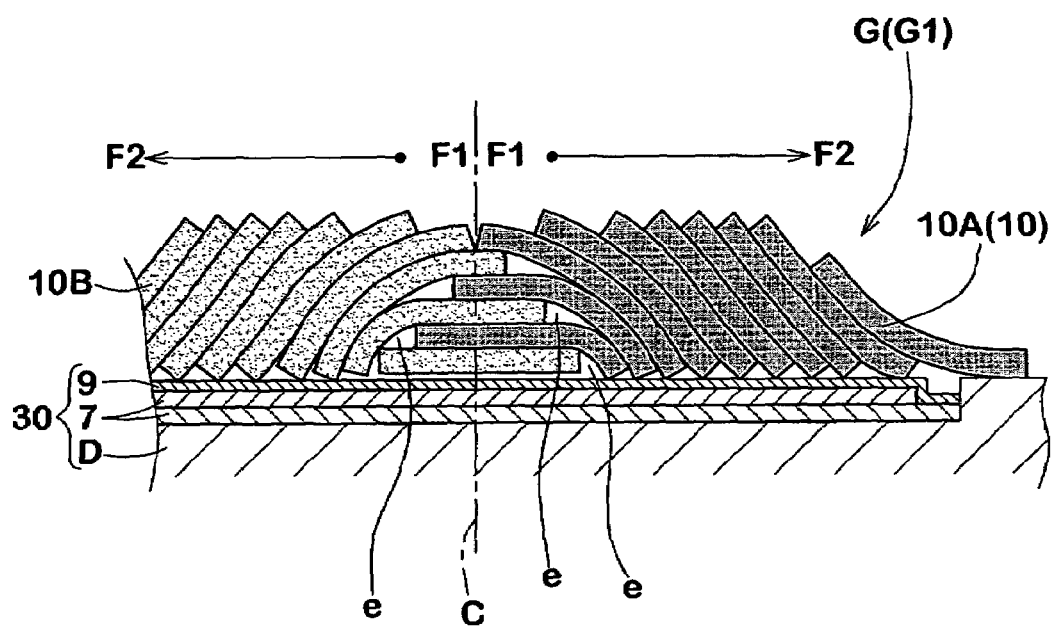
FIG. 2 is a sectional view when the tire rubber member is a tread rubber.

FIG. 2 shows a case in which the rubber strip 10 is wound in the overlapping manner around the surface of the to-be wound body 30 to form the tread rubber G1. In this example, the to-be wound body 30 includes a cylindrical forming drum D, and the belt 7 and the band 9 which are sequentially formed on an outer periphery of the forming drum D. Especially in FIG. 2, two rubber strips 10A and 10B are used, and as the to-be wound body 30 rotates, the rubber strip 10A is spirally wound in the overlapping manner while shifting the rubber strip from the tire equator C to the right side in the tire axial direction, and the other rubber strip 10B is spirally wound in the overlapping manner while shifting the rubber strip from the tire equator C to the left side in the tire axial direction. That is, in this example, the rubber strip 10A is shifted from the one axial side F1 which is close to the tire equator C toward the other side F2 which is right side in the tire axial direction, and the other rubber strip 10B is shifted from the axial one side F1 which is close to the tire equator C toward the other side F2 which is left side in the tire axial direction.

Next, in the strip winding system, gaps e are formed between the wound rubber strips 10 and 10, and between the rubber strip 10 and the to-be wound body 30. Thus, after vulcanization, there is a problem that air remains in the gaps e and the tire is damaged, and the quality of tire is deteriorated.

Figure 3:
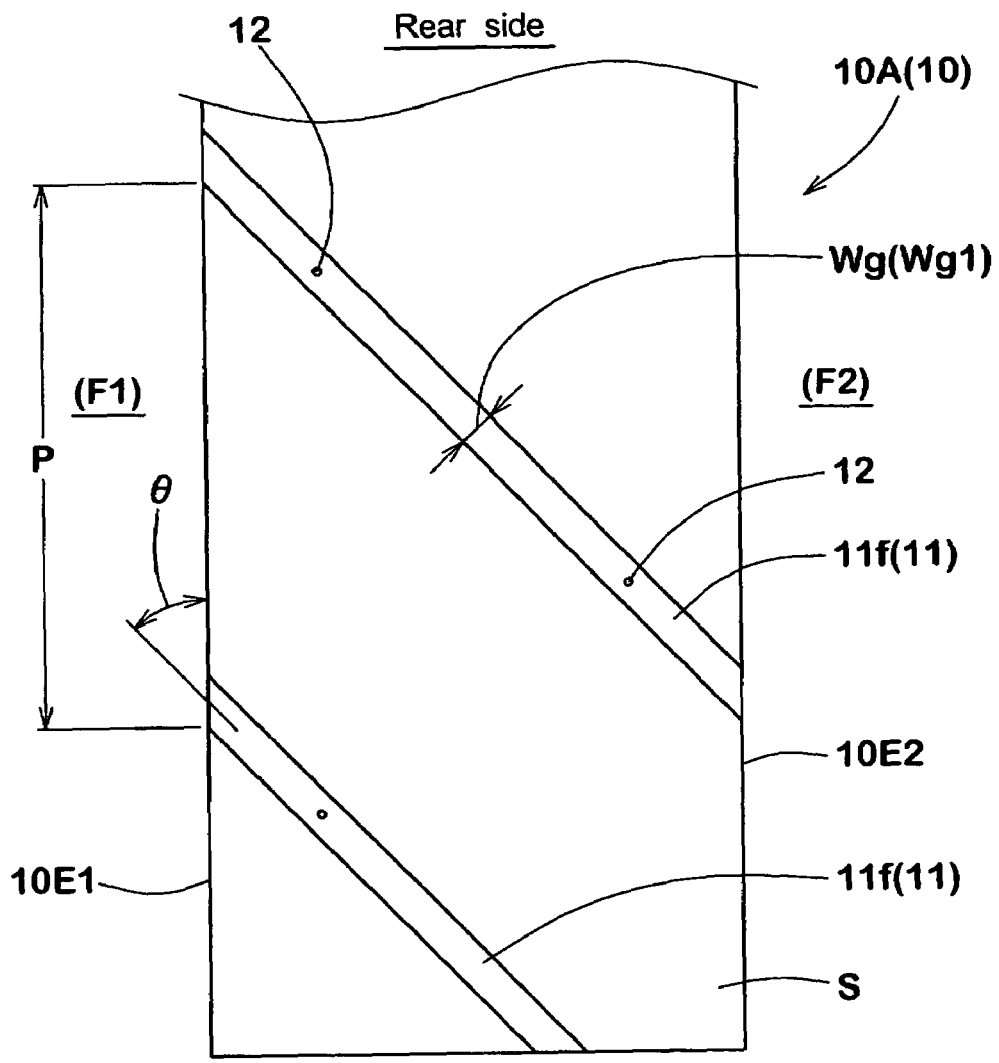
FIG. 3 are plan view and sectional view showing a rubber strip together with air-vent grooves.
Figure 3:
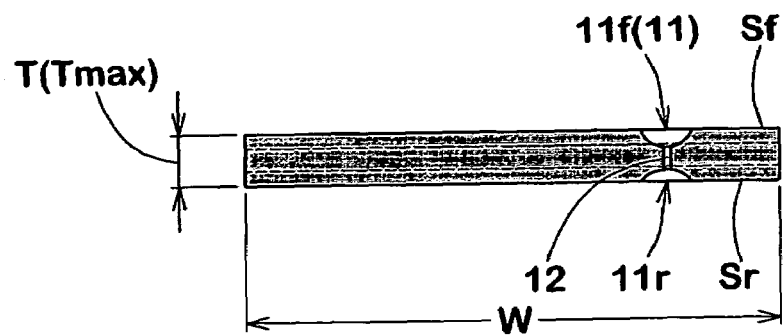

Thus, to eliminate air in the gap e, as shown in FIG. 3, a plurality of air-vent grooves 11 extending in a direction intersecting with the longitudinal direction of the rubber strip 10 are formed on at least one surface S of the rubber strip 10. In this example, in order to enhance the air-vent effect, both the surfaces Sf and Sr of the rubber strip 10 are formed with the air-vent grooves 11, and the air-vent groove 11f formed on the one surface Sf and the air-vent groove 11r formed on the other surface Sr are formed substantially at the same positions. Each air-vent groove 11 is formed with one or more air-vent holes 12 passing through the rubber strip 10 and extending in the thickness direction.

With this structure, air in the gape can be discharged outside from the side line 10E of the rubber strip 10 through the air-vent grooves 11, and air passing through the air-vent groove 11 can be discharged directly through the opposite surface of the rubber strip 10 from the air-vent hole 12. That is, when the air-vent groove 11 and the air-vent hole 12 are used in combination, the plurality of air-vent flow paths can be made complicated by the interaction thereof, and the venting performance can largely be enhanced.

When the air-vent grooves 11 are formed on both the surfaces Sf and Sr of the rubber strip 10, the number of air-vent grooves 11 to be formed on both the surfaces Sf and Sr can be reduced by half while maintaining the ventilation performance at the same level. Therefore, the change that the air-vent groove 11 is exposed to the surface of the winding body can be reduced. Thus, the deterioration of outward appearance such as a trace of the air-vent groove 11 remaining on the surface of the vulcanized tire surface can be suppressed. Especially when an air-vent groove 11f formed on the one surface Sf and an air-vent groove 11r formed on the other surface Sr are formed at the same positions, a later-described groove-forming step can be employed. As a result, there are many merits that the number of groove forming steps can be reduced by half, a structure and control of the groove forming apparatus can be simplified. When the air-vent hole 12 is also used, both ends of the air-vent hole 12 are opened in the air-vent grooves 11f and 11r. Therefore, even when the rubber strip 10 is overlapped, the opening of the air-vent hole 12 is not closed and the air-vent effect is not deteriorated, and the high reliability and high venting performance can be maintained.

Here, as the rubber strip 10, a rubber strip having a saucer laterally long cross section having 0.7 to 4.0 mm thickness T and width W of 10 to 20 times greater than the thickness T can suitably be used. In this example, a rubber strip having a rectangular cross sectional shape is used for convenience sake. However, as shown in FIGS. 8 and 9, a preferable rubber strip has a thickest portion 35 whose central side in the widthwise direction has the thickness T of the maximum value Tmax, a tapered portion 36 whose thickness is gradually reduced toward the both side edges 10E on both sides of the thickest portion 35, and the both sides are tapered. With this rubber strip, the gape itself can be reduced. Examples of preferable both sides tapered shape are:

<1> trapezoidal shapes 10a and 10b (FIGS. 8A and 8B) in which the thickest portion 35 exists with a predetermined width and the thickest portion 35 is provided at its both sides with slants;

<2> substantially trapezoidal shapes 10c, 10d and 10i (FIGS. 8C, 8D and 8E) in which the slant of the tapered portion 36 is replaced by a convex arc surface or a convex arc surface; and <3> Semi-arc shapes 10e and 10f (FIGS. 9A and 9B) and both arc shapes 10g and 10h (FIGS. 9C and 9D) in which the thickest portion 35 exists in a form of a point, and the tapered portions 36 having arc surfaces are continuously formed on both sides of the thickest portion 35.

In the case of the both sides tapered shape, the maximum value Tmax of the thickness, i.e., the maximum thickness Tmax is in a range of 0.7 to 4.0 mm. In the case of the rectangular cross sectional shape, the tapered portion 36 is eliminated, and the rubber strip 10 is formed using only the thickest portion 35.

The air-vent groove 11 has an angle θ of 20 to 90° with respect to the longitudinal direction of the rubber strip, and continuously extends between the side lines 10E and 10E of the rubber strip 10. This angle θ may be 90°. In this case, there is a merit that air can be discharged toward the side line 10E in the shortest distance.

However, due to the following reason, it is preferable that the angle θ is smaller than 90°. At that time, it is preferable that the air-vent groove 11 is inclined from the other side F2 toward the one side F1 in the axial direction toward the winding rear side.

Figure 4:
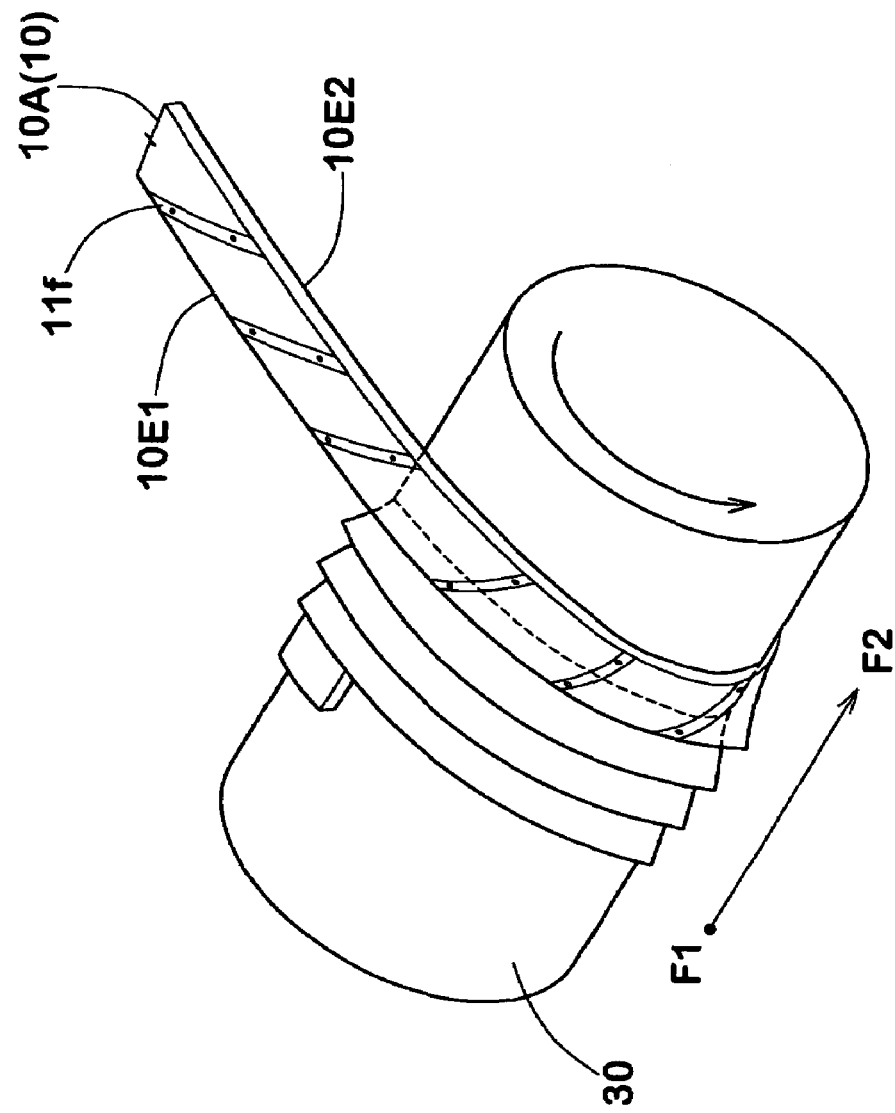
FIG. 4 is a perspective view for explaining effect of the air-vent groove.

As conceptionally shown in FIG. 4, the rubber strip 10 is spirally wound and overlapped as the to-be wound body 30 rotates while shifting the rubber strip 10 from the one side F1 toward the other side F2 in the axial direction. Air in the gap e passes through the air-vent groove 11, and is discharged from the side line 10E2 of the other side F2 of the rubber strip 10 into a direction facing the side line 10E1 of the one side F1. At that time, since the rubber strip 10 is shifted from the one side F1 to the other side F2 in succession, the side line 10E2 of the other side F2 of the rubber strip 10 is located at a deep position which is radially inward of the winding body, and the side line 10E1 of the one side F1 is located on a side where the side line 10E1 is exposed to the outer surface of the winding body. Therefore, when it is brought into the inclined direction, the air-vent flow path is formed in which the air-vent direction becomes "inside of the winding body→surface of the winding body". Thus, air in the winding body is discharged outside and in this state, the rubber strip 10 can be wound and air is effectively prevented from remaining inside.

However, if the angle θ becomes smaller than 20°, the length of the air-vent flow path becomes excessively long, the air-vent efficiency is deteriorated, and there is an adverse possibility that air remains in the air-vent flow path. Therefore, it is preferable that the lower limit of the angle θ is 25° or higher. The upper limit value of the angle θ is 90°. As described above, in order to make the air-vent direction "inside of the winding body→surface of the winding body", it is preferable that the upper limit value of the angle θ is 70° or less and more preferably 65° or less.

It is preferable that the distance P in the longitudinal direction of the rubber strip between the air-vent grooves 11 and 11 is in a range of 40 to 200 mm, and if the distance P exceeds 200 mm, there is a tendency that air remains. If the distance P is less than 40 mm, this is excessive quality and there is a tendency that the strength is deteriorated rubber strip 10 more than necessary.

Figure 5:
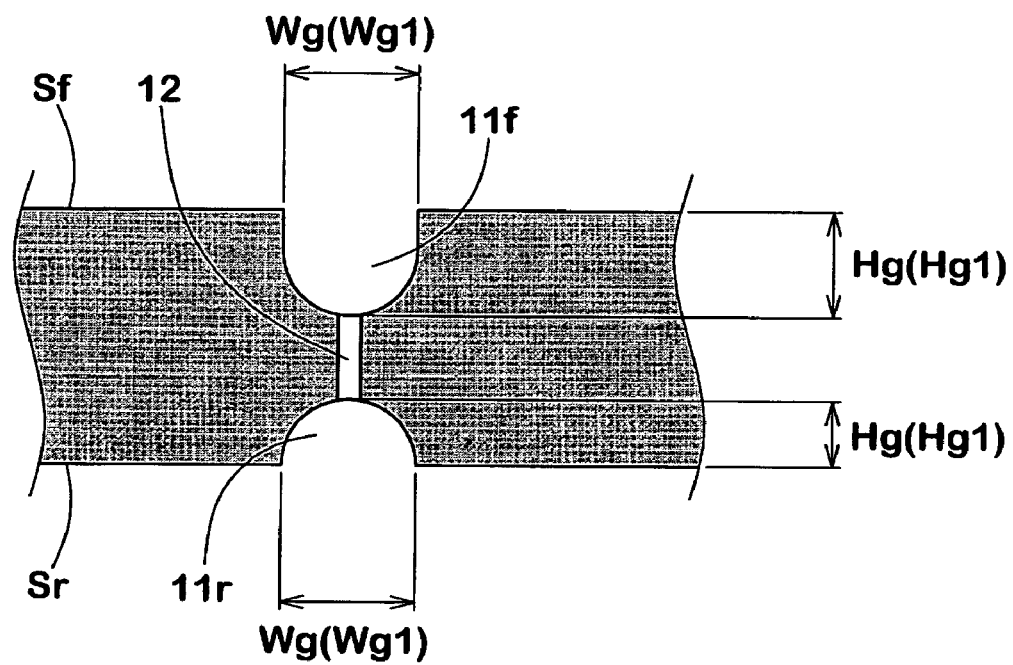
FIG. 5 is a sectional view showing a cross sectional shape of the air-vent groove.

As shown in FIG. 5, in the air-vent groove 11, its maximum value Wg1 (maximum width Wg1) of its groove width Wg is set in a range of 0.3 to 3.0 mm, and its maximum value Hg1 (maximum depth Hg1) of the groove depth Hg is set in a range of 0.1 to 3.0 mm.

When the rubber strip 10 has a rectangular cross sectional shape, the groove width Wg and the groove depth Hg are constant from the side line 10E1 to the side line 10E2. That is, the constant groove width Wg and the constant groove depth Hg form the maximum width Wg1 and maximum depth Hg1. When the maximum width Wg1 exceeds 3.0 mm and the maximum depth Hg1 exceeds 3.0, the groove volume becomes excessively large, rubber flowing shortage is caused at the time of vulcanization formation, and there is a problem that the trace of the air-vent groove 11 remains as a flaw. If the maximum width Wg1 is less than 0.3 mm and the maximum depth Hg1 is less than 0.1 mm on the contrary, the air-vent effect can not sufficiently be exhibited.

Next, one example of the groove-forming step for forming air-vent grooves 11f and 11r at the same positions on the both surfaces Sf and Sr of the rubber strip 10 will be explained. Shown in FIG. 6, the groove-forming step is a step for forming the air-vent grooves 11f and 11r on the both surfaces Sf and Sr at a time by allowing a strip base body 20 extruded with a final cross sectional shape, i.e., the outline shape of the rubber strip 10 to pass through between rollers 22U and 22L of a groove forming apparatus 22 having a patterning roller 22U in which a groove forming rib 21 for forming the air-vent groove on the outer peripheral surface, and a smoothening roller 22L whose outer peripheral surface is a smooth surface.

Figure 7A:
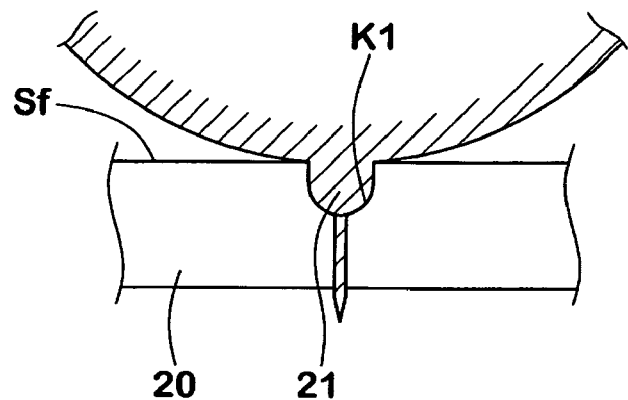
FIGS. 7A to 7C are sectional views for explaining how to form the air-vent groove in the groove-forming step.
Figure 7B:
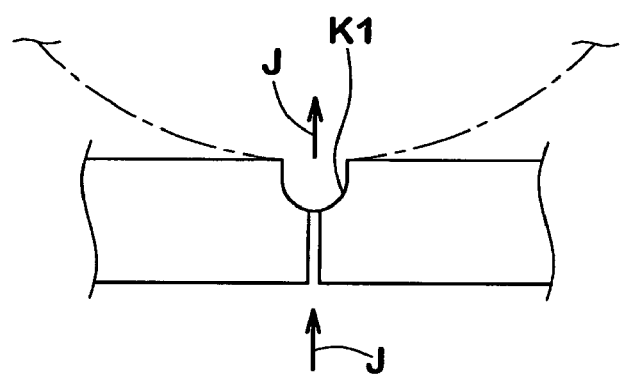
Figure 7C:
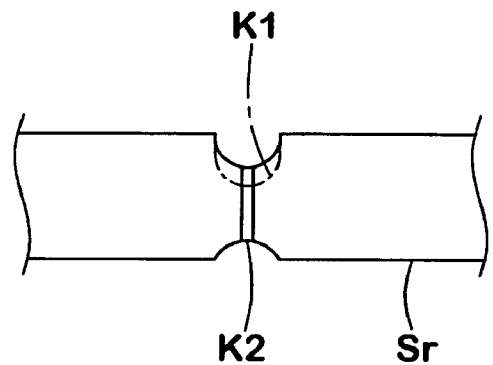
Figure 8A:
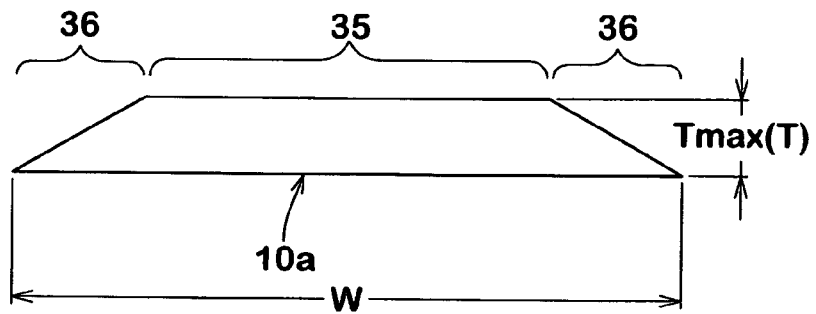
FIGS. 8A to 8E are sectional views for explaining other cross sectional shapes of the rubber strip.
Figure 8B:
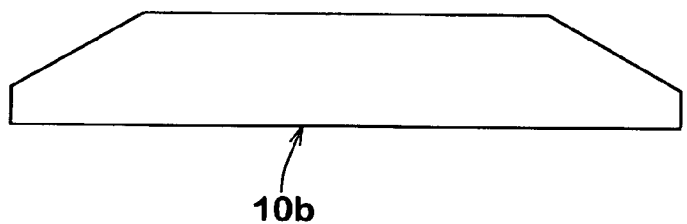
Figure 8C:
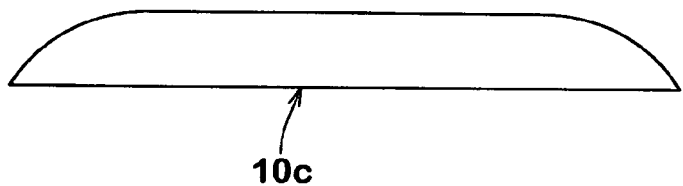
Figure 8D:
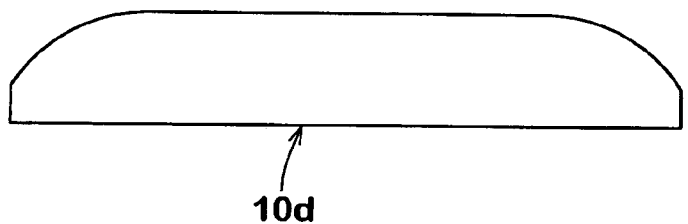
Figure 8E:
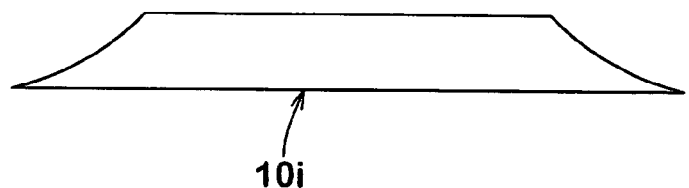
Figure 9A:
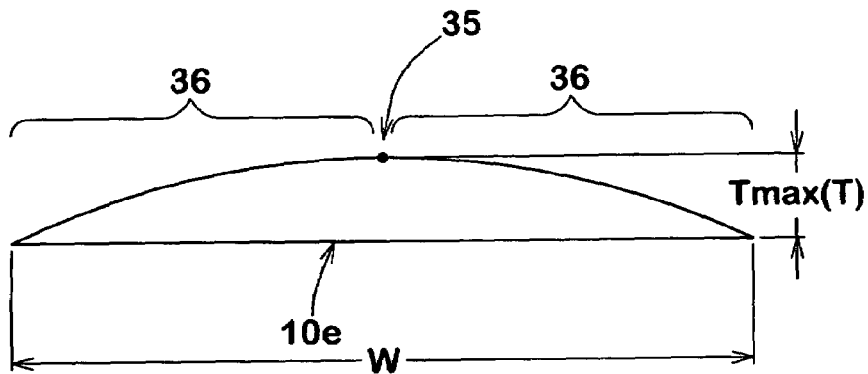
FIGS. 9A to 9D are sectional views for explaining still other cross sectional shapes of the rubber strip.
Figure 9B:
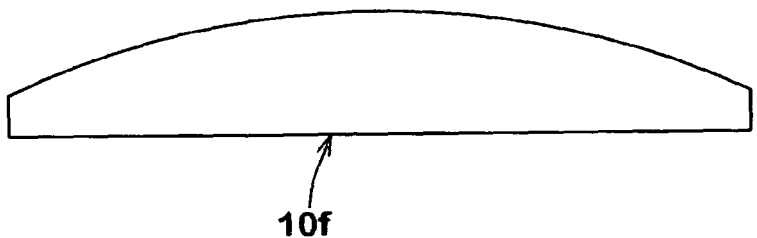
Figure 9C:
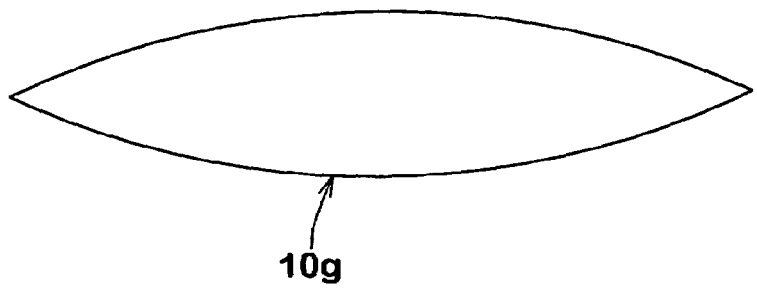
Figure 9D:
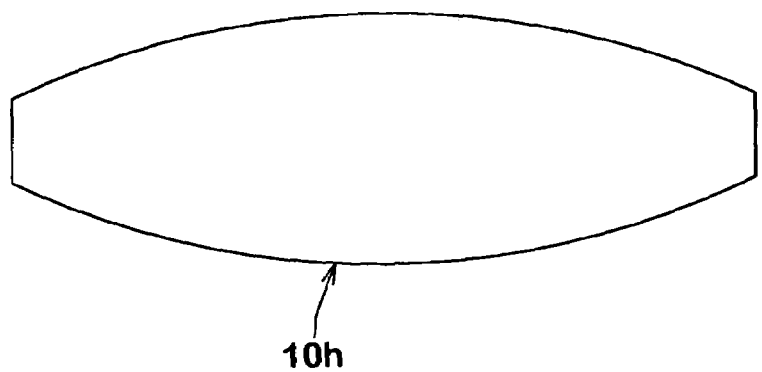

More specifically, in the groove forming apparatus 22, a gap between the patterning roller 22U and the smoothening roller 22L is substantially the same as the thickness T of the rubber strip 10, i.e., the thickness T of the strip base body 20, and the projecting height h of the groove forming rib 21 is greater than the groove depth Hg of one of the air-vent groove 11f and is greater than a sum of the depths Hg of both the air-vent grooves 11f and 11r. As shown in FIG. 7A, the groove forming rib 21 enters the strip base body 20 by allowing the strip base body 20 to pass through between the rollers 22U and 22L and with this, a press-in deformation K1 is generated on one of the surfaces Sf. At that time, a stress a trying to restore the press-in deformation K1 is generated in the rubber portion between the groove forming rib 21 and the smoothening roller 22L as shown in FIG. 7B. When the groove forming rib 21 passes, as shown in FIG. 7C, a portion of the press-in deformation K1 is restored by the stress J, and a groove-like restoring deformation K2 is generated on the other surface Sr and at the same position as that of the press-in deformation K1. If the groove-forming step using the groove forming apparatus 22 is employed in this manner, it is possible to simultaneously form the air-vent grooves 11f and 11r on both surfaces Sf and Sr of the strip base body 20 at substantially the same positions. At that time, it is preferable that a bottom of the air-vent groove 11 is of arc.

The patterning roller 22U is provided with hole-forming means 25 which holds a holing needle 24 for forming the air-vent hole 12 in a telescopic manner from the tip end of the groove forming rib 21.

Figure 6:
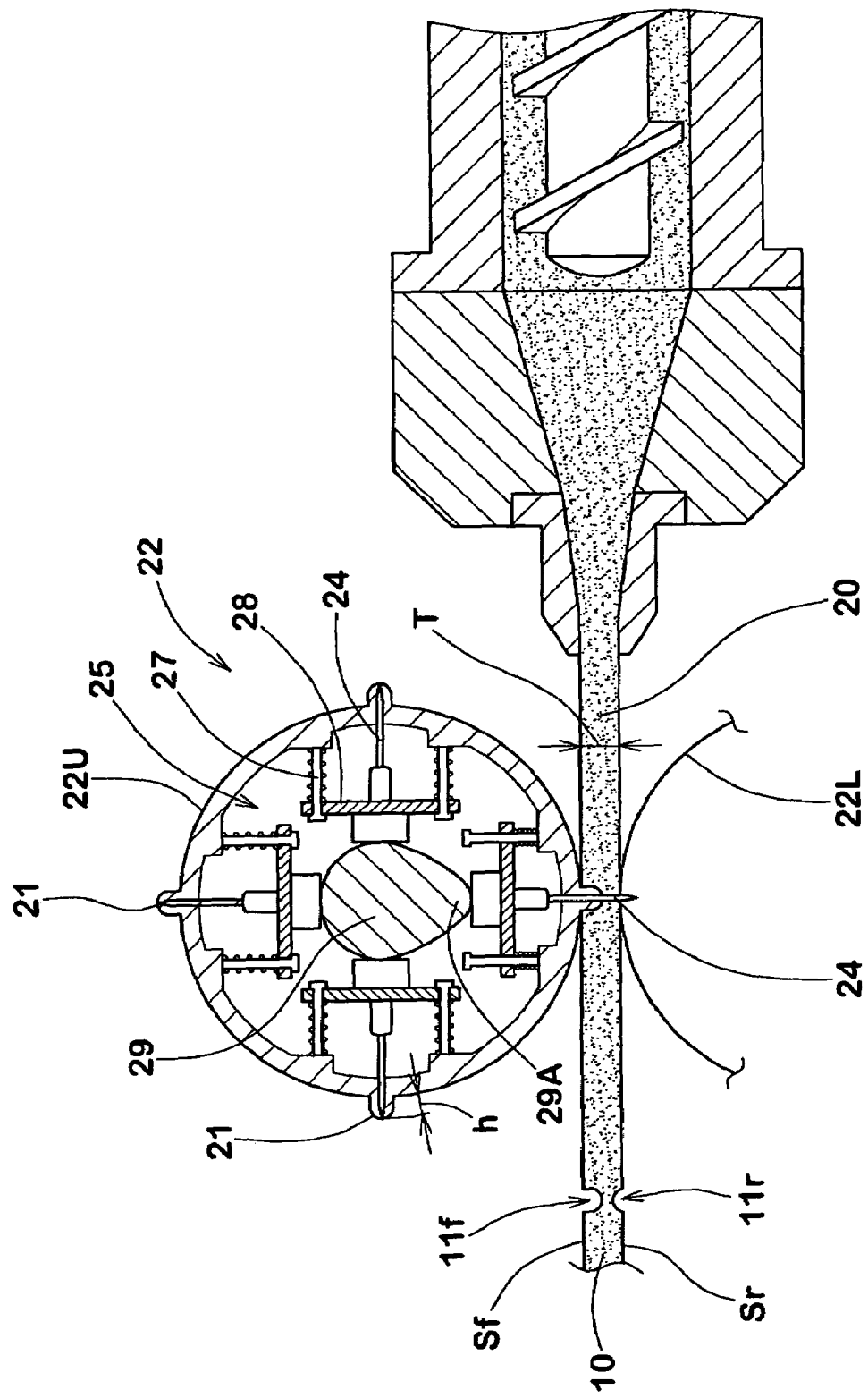
FIG. 6 is a side view for explaining a groove-forming step.

As shown in FIG. 6, the hole-forming means 25 includes one or more (four, in this example) slide plates 28 which are supported by a guide pin 27 mounted on an inner wall of the patterning roller 22U such that the slide plates 28 can move in parallel radially inward and outward. Each slide plate 28 is mounted such that a tip end of the holing needle 24 is oriented radially outward. The slide plate 28 is biased radially inward by a spring member such as a coil spring fitted over the guide pin 27 and with this, the holing needle 24 is always retracted radially inward of a front end of the groove forming rib 21 and stays on standby. A cam 29 which does not rotate is disposed in the cavity of the patterning roller 22U, the cam portion 29A abuts against the slide plate 28, the holing needle 24 is pushed down and the cam 29 projects from a front end of the groove forming rib 21.

Since the hole-forming means 25 holds the holing needle 24 such that the holing needle 24 can project and retract from and into the tip end of the groove forming rib 21, it is possible to pierce the holing needle 24 substantially at right angles with respect to the strip base body 20, and damage caused in the rubber strip 10 due to the hole forming operation can be suppressed to the minimum value.

The maximum thickness of the needle portion of the holing needle 24 piercing the strip base body 20 is preferably 0.5 mm or more and the maximum width Wg1 of the air-vent groove 11 is preferably in a range of 25 to 100%. It is preferable that its lower limit value is 30% of more of the maximum width Wg1, and more preferably 40% or more. If the maximum thickness is less than 0.5 mm or less than 25% of the maximum width Wg1, the diameter of the air-vent hole 12 is too small, and the air-vent effect is insufficient. If it exceeds 100% of the maximum width Wg1 on the contrary, the strength of the rubber strip 10 is deteriorated, and when tension is applied, a crack is generated and the rubber strip may be cut halfway through the winding operation.

The structure of such a groove forming apparatus 22 is simple, and the number of machining steps to the strip base body 20 is small and thus, the productivity can be enhanced. Since both the air-vent grooves 11f and 11r can be formed in precise positions, complicated control between the rollers which is required when each roller is formed with the groove-forming rib is unnecessary, and the control means can also be simplified.

When the groove-forming step is employed, the groove volume V2 of the air-vent groove 11r on the other surface Sr which is on the side of the restoring deformation K2 necessarily becomes smaller than the groove volume V1 of the air-vent groove 11f on the one surface Sf which is on the side of the press-in deformation K1, but it is possible to increase the ratio V2/V1 of the groove volume to a range of 50 to 90%. If the maximum width Wg1 is in a range of 0.3 to 3.0 mm and the maximum depth Hg1 is in a range of 0.1 to 3.0 mm in each of the air-vent grooves 11f and 11r, the air-vent performance can sufficiently be exhibited when the ratio V2/V1 of the groove volume is in a range of 50 to 90%. It is technically difficult to set the ratio V2/V1 to 90% or higher by the groove-forming step, and if the ratio V2/V1 is lower than 50%, the air-vent effect is deteriorated.

When the groove-forming step is employed, if the thickness T of the rubber strip 10 is excessively large, there storing deformation K2 becomes insufficient, and the air-vent groove 11r having a necessary groove depth Hg can not be formed. Therefore, it is preferable that the thickness T is 4.0 mm or less. If the thickness T is too thin, the number of windings is increased, the productivity of the tire rubber member G is lowered and thus, the lower limit value is preferably 0.7 mm or more. To exhibit the air-vent effect, it is necessary that the rubber strip 10 has certain rigidity and for this purpose, it is preferable to set the ratio W/T of the thickness T and the width W in a range of 10 to 20.

Figure 10:
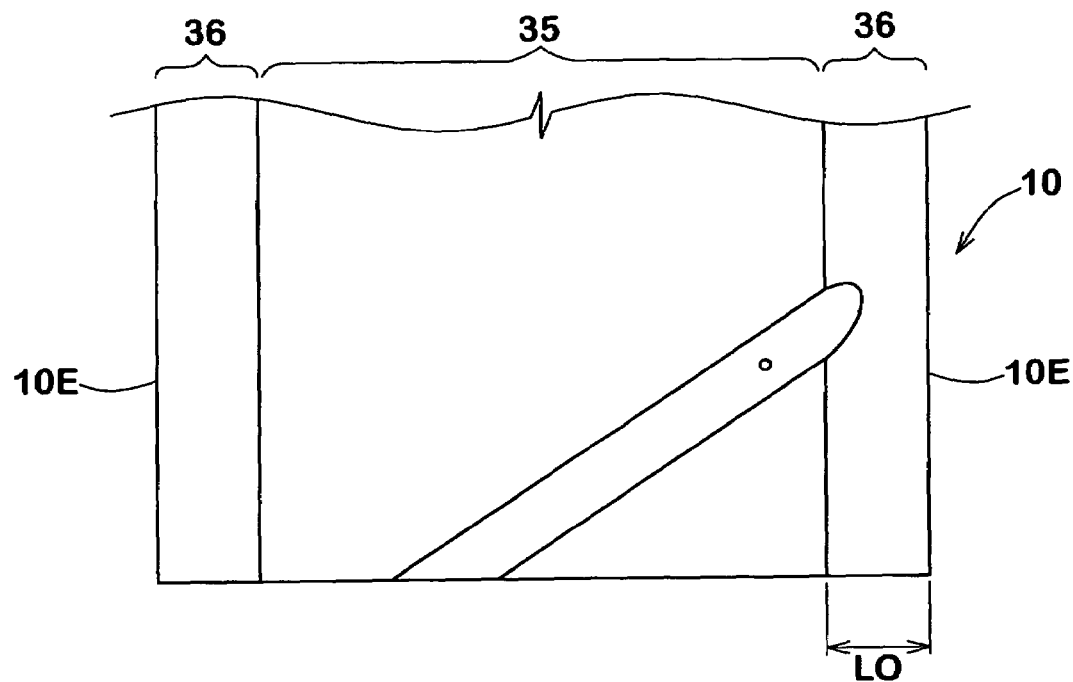
FIG. 10 are sectional views for explaining the air-vent groove when the rubber strip is of both sides tapered shape.
Figure 10:
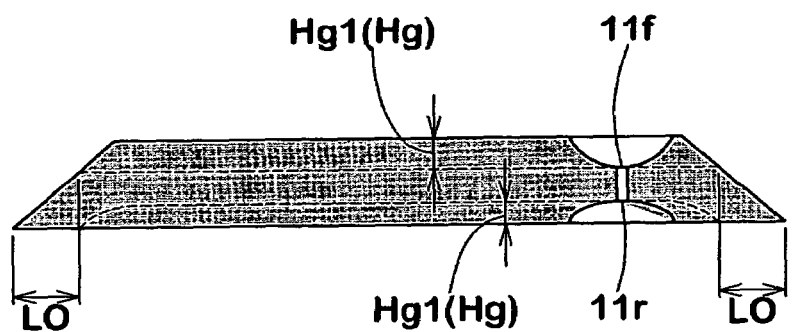
Figure 11A:
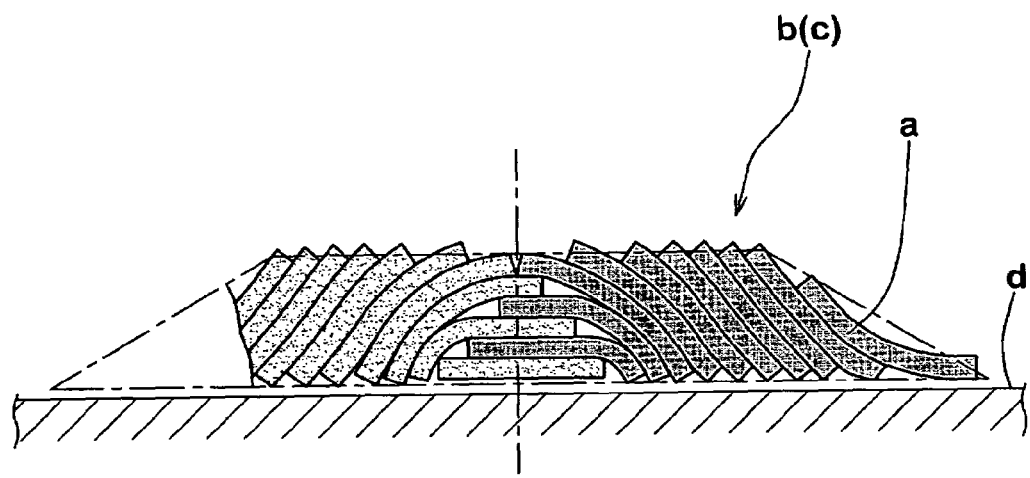
FIGS. 11A and 11B are sectional views for explaining a problem of a conventional technique.
Figure 11B:
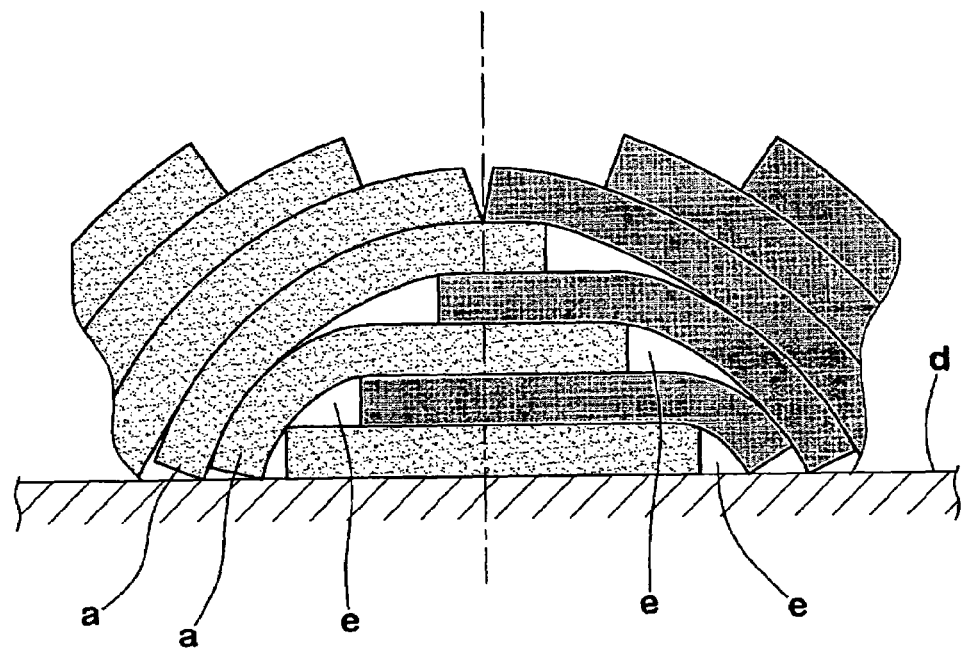

Next, a case where the cross sectional shape of the rubber strip 10 is the both sides tapered shape as shown in FIGS. 8 and 9 will be explained. The case of the trapezoidal shape 10a shown in FIG. 8A will be explained as a representative. As shown in FIG. 10, in the rubber strip 10, the tapered portions 36 whose thickness is gradually reduced toward the both side edges 10E are continuously formed on both sides of the thickest portion 35. In this case, in the thickest portion 35, the air-vent grooves 11f and 11r extends to the maximum depth Hg1. In the tapered portion 36, the groove depth Hg of each of the air-vent grooves 11f and 11r is gradually reduced toward the both side edges 10E, and the air-vent groove is terminated at a location away from the side line 10E inward by a distance L0. This is because that the cutting strength is largely reduced and there is an adverse possibility that the rubber is cut from this weak portion when the air-vent groove 11 is formed up to the side line 10E. However, if the distance L0 exceeds 2.0 mm, it becomes difficult to discharge air from the side line 10E. Therefore, it is preferable that the distance L0 is greater than 0 mm and 2.0 mm or less. In the case of such a both side tapered shape also, the groove-forming step can be employed.

In the present invention, various tire rubber members G other than the tire rubber G1 can be formed by winding the rubber strip 10 (not shown). When the tire rubber member G, e.g., the tread rubber G1, the sidewall rubber G2, the clinch rubber G4 or the inner liner rubber G3 forming a tire outer surface, or a tire cavity surface is formed by winding the rubber strip 10, it is possible to reduce air remaining between the tire outer surface and the vulcanization mold and between the tire cavity surface of the tire and a bladder, and the outer appearance quality can also be enhanced.

Although the preferable embodiment of the present invention has been described in detail, the invention is not limited to the illustrated example, and the invention can be modified into various modes and carried out.

EXAMPLES

Pneumatic tires (tire size 215/45ZR17) in which a tread rubber was formed using a rubber strip having specification shown in Table 1 were prototyped. In each of the prototyped tires, generation states of defects caused by remained air were compared and evaluated. When the inclination angle of the 11 is less than 90°, the air-vent groove 11 is inclined from the other side F2 to the one side F1 in the axial direction toward the rear side of the winding. The specifications other than those described in Table 1 are all the same.

<Generation States of Defects>

(Remained air): one hundred prototyped tires were prepared for each embodiment, deformations caused by air remained in the tread were visually checked, and the number of tires having the deformations was evaluated.

(Generation of flaw): one hundred prototyped tires were prepared for each embodiment, flaw on tread surfaces caused by remaining air or air-vent grooves were visually checked, and the number of tires having the flaws was evaluated.

TABLE 1

|  | Example 1 | Example 2 | Example 3 | Example 4 | Example 5 | Example 6 | Example 7 | Example 8 |
|---|---|---|---|---|---|---|---|---|
| Rubber strip | | | | | | | | |
| Cross sectional shape | Trapezoid (FIG. 8A) | Trapezoid (FIG. 8A) | Trapezoid (FIG. 8A) | Trapezoid (FIG. 8A) | Rectangle (FIG. 3) | Trapezoid (FIG. 8A) | Trapezoid (FIG. 8A) | Trapezoid (FIG. 8A) |
| Maximum thickness Tmax <mm> | 2.0 | 2.0 | 5.0 | 2.0 | 5.0 | 2.0 | 2.0 | 2.0 |
| Width W <mm> | 20 | 20 | 20 | 20 | 20 | 20 | 20 | 20 |
| Air-vent groove | Presence | Presence | Presence | Presence | Presence | Presence | Presence | Presence |
| Forming surface | Both surfaces | One surface | One surface | Both surfaces | Both surfaces | Both surfaces | Both surfaces | Both surfaces |
| Angle θ <°> | 90 | 90 | 45 | 75 | 45 | 45 | 65 | 45 |
| Distance P <mm> | 100 | 100 | 100 | 100 | 100 | 100 | 100 | 100 |
| Maximum groove width Wg1 <mm> *1 | 1.5 (1.5) | 1.5 (1.5) | 1.5 (1.5) | 1.5 (1.5) | 1.5 (1.5) | 1.5 (1.5) | 1.5 (1.5) | 1.5 (1.5) |

TABLE 1-continued

|  | Example 1 | Example 2 | Example 3 | Example 4 | Example 5 | Example 6 | Example 7 | Example 8 |
|---|---|---|---|---|---|---|---|---|
| Maximum groove depth Hg1 <mm> *2 | 1.0 (0.5) | 1.0 (0.5) | 1.0 (0.5) | 1.0 (0.5) | 2.0 (0.5) | 1.0 (0.5) | 1.0 (0.5) | 1.0 (0.5) |
| Air-vent hole | Absence | Absence | Absence | Absence | Absence | Absence | Absence | Absence |
| Generation state of defect |  |  |  |  |  |  |  |  |
| Remaining air <the number of deformations> | 4 | 9 | 8 | 5 | 0 | 0 | 2 | 0 |
| Flaw<the number of deformations> | 2 | 0 | 4 | 3 | 3 | 0 | 1 | 0 |

*1 and *2 Numeric values in brackets represent maximum groove width Wg1 and maximum groove depth Hg1 of air discharge groove formed on back surface.

TABLE 2

|  | Example 9 | Example 10 | Example 11 | Example 12 | Example 13 | Example 14 | Example 15 | Example 16 |
|---|---|---|---|---|---|---|---|---|
| Rubber strip |  |  |  |  |  |  |  |  |
| Cross sectional shape | Trapezoid (FIG. 8A) | Trapezoid (FIG. 8A) | Trapezoid (FIG. 8A) | Both side are arcs (FIG. 9C) | Trapezoid (FIG. 8A) | Trapezoid (FIG. 8A) | Trapezoid (FIG. 3) | Trapezoid (FIG. 3) |
| Maximum thickness Tmax <mm> | 5.0 | 2.0 | 2.0 | 2.0 | 2.0 | 2.0 | 2.0 | 2.0 |
| Width W <mm> | 20 | 20 | 20 | 20 | 20 | 20 | 20 | 20 |
| Air-vent groove Forming surface | Presence Both surfaces | Presence Both surfaces | Presence Both surfaces | Presence Both surfaces | Presence Both surfaces | Presence Both surfaces | Presence Both surfaces | Presence Both surfaces |
| Angle θ <°> | 45 | 45 | 25 | 45 | 45 | 45 | 45 | 45 |
| Distance P <mm> | 100 | 100 | 100 | 100 | 100 | 100 | 100 | 100 |
| Maximum groove width Wg1 <mm> *1 | 1.5 (1.5) | 1.5 (1.5) | 1.5 (1.5) | 1.5 (1.5) | 3.0 (1.5) | 1.0 (1.5) | 1.5 (1.5) | 1.5 (1.5) |
| Maximum groove depth Hg1 <mm> *2 | 1.0 (0.5) | 0.5 (0.5) | 1.0 (0.5) | 2.0 (0.5) | 1.0 (0.5) | 1.0 (0.5) | 0.3 (0.3) | 2.0 (0.5) |
| Air-vent hole | Absence | Absence | Absence | Absence | Absence | Absence | Absence | Absence |
| Generation state of defect |  |  |  |  |  |  |  |  |
| Remaining air <the number of deformations> | 1 | 2 | 2 | 0 | 4 | 6 | 5 | 3 |
| Flaw<the number of deformations> | 0 | 0 | 1 | 0 | 2 | 3 | 4 | 3 |

*1 and *2 Numeric values in brackets represent maximum groove width Wg1 and maximum groove depth Hg1 of air discharge groove formed on back surface.

TABLE 3

|  | Example 17 | Example 18 | Example 19 | Example 20 | Example 21 | Example 22 | Example 23 | Example 24 | Example 25 | Example 26 |
|---|---|---|---|---|---|---|---|---|---|---|
| Rubber strip |  |  |  |  |  |  |  |  |  |  |
| Cross sectional shape | Trapezoid (FIG. 8A) | Trapezoid (FIG. 8A) | Trapezoid (FIG. 8A) | Trapezoid (FIG. 8A) | Trapezoid (FIG. 8A) | Trapezoid (FIG. 8A) | Trapezoid (FIG. 8A) | Trapezoid (FIG. 8A) | Trapezoid (FIG. 8A) | Trapezoid (FIG. 8A) |
| Maximum thickness Tmax <mm> | 2.0 | 2.0 | 5.0 | 2.0 | 2.0 | 2.0 | 2.0 | 2.0 | 2.0 | 2.0 |
| Width W <mm> | 20 | 20 | 20 | 20 | 20 | 20 | 20 | 20 | 20 | 20 |
| Air-vent groove | Presence | Presence | Presence | Presence | Presence | Presence | Presence | Presence | Presence | Presence |
| Forming surface | Both surfaces | Both surfaces | Both surfaces | Both surfaces | Both surfaces | Both surfaces | One surface | Both surfaces | Both surfaces | One surface |
| Angle θ <°> | 90 | 20 | 45 | 45 | 25 | 90 | 90 | 45 | 25 | 90 |
| Distance P <mm> | 100 | 100 | 100 | 100 | 100 | 100 | 100 | 100 | 100 | 100 |

TABLE 3-continued

|  | Example 17 | Example 18 | Example 19 | Example 20 | Example 21 | Example 22 | Example 23 | Example 24 | Example 25 | Example 26 |
|---|---|---|---|---|---|---|---|---|---|---|
| Maximum groove width Wg1 <mm> *1 | 1.5 (1.0) | 1.5 (1.0) | 1.5 (1.0) | 1.5 (1.0) | 1.5 (1.0) | 1.5 (1.0) | 1.5 | 1.5 (1.0) | 1.5 (1.0) | 1.5 |
| Maximum groove depth Hg1 <mm> *2 | 1.0 (1.0) | 1.0 (1.0) | 1.0 (1.0) | 0.5 (1.0) | 1.0 (1.0) | 1.0 (1.0) | 1.0 | 0.5 (1.0) | 1.0 (1.0) | 1.5 |
| Air-vent hole | Absence | Absence | Absence | Absence | Absence | Presence | Presence | Presence | Presence | Presence |
| Generation state of defect |  |  |  |  |  |  |  |  |  |  |
| Remaining air <the number of deformations> | 4 | 5 | 1 | 2 | 2 | 0 | 0 | 0 | 0 | 0 |
| Flaw <the number of deformations> | 2 | 3 | 0 | 0 | 1 | 0 | 0 | 0 | 0 | 0 |

*1 and *2 Numeric values in brackets represent maximum groove width Wg1 and maximum groove depth Hg1 of air discharge groove formed on back surface.

When there is not air-vent hole, as can be seen from comparison with the example 1, and comparison between the examples 3 and 9, it is preferable that to form the air-vent grooves on both surfaces of the rubber strip to suppress defects. When there is no air-vent hole, 90° is not sufficient as the angle θ of the air-vent groove for suppressing defect. As can be seen from comparison between the examples 1, 4, 6 and 7, in order to suppress the defect, the angle θ is preferably as small as 75°, 65° or 45°.

As can be seen from the examples 22 to 26, influence of the air-vent hole on the air vent effect is extremely high. Therefore, when there is the air-vent hole, sufficient air vent effect is exhibited even when the air-vent groove is formed only on one surface of the rubber strip and the angle θ is 90°, and the defect can largely be suppressed.

What is claimed is:

1. A manufacturing method of a rubber member for a tire comprising a winding step of forming the rubber member in which a rubber strip is overlapped, by overlapping and spirally winding the rubber strip on a cylindrical to-be wound body while shifting the rubber strip from one side to the other side of the axial direction of the to-be wound body; wherein
   a plurality of air-vent grooves capable of discharging air between the overlapped rubber strips are arranged on at least one of surfaces of the rubber strip,
   each of the air-vent grooves has an angle θ of 20 to 90° with respect to a longitudinal direction of the rubber strip, and extends between side lines of the rubber strip, a maximum width of the air-vent groove being 0.3 to 3.0 mm, and a maximum depth of the air-vent groove being 0.1 to 3.0 mm, and
   each of the air-vent grooves includes one or more air-vent holes extending to penetrate the rubber strip.

2. The manufacturing method of the rubber member for the tire according to claim 1, wherein the angle θ is 20 to 70°, and the air-vent grooves are inclined to said one side from said other side of the axial direction toward a winding rear side of the rubber strip.

3. The manufacturing method of the rubber member for the tire according to claim 1, wherein the rubber strip is provided on both of surfaces with the air-vent grooves, respectively, and each of the air-vent grooves on the one surface is formed substantially at the same position as each of the air-vent grooves on the other surface.

4. The manufacturing method of the rubber member for the tire according to claim 3, wherein a groove volume V2 of the air-vent groove formed on the other surface of the rubber strip is 50 to 90% of a groove volume V1 of the air-vent groove formed on the one surface.

5. The manufacturing method of the rubber member for the tire according to claim 1, wherein the air-vent grooves are arranged at distances P of 40 to 200 mm from each other in the longitudinal direction of the rubber strip.

6. The manufacturing method of the rubber member for the tire according to claim 1, wherein the rubber strip includes a thickest portion on a central side in the widthwise direction in which a thickness thereof becomes maximum, and tapered portions which are connected to both sides of the thickest portion and whose thickness is gradually reduced toward both side edges thereof, the air-vent groove extends to the maximum groove depth in the thickest portion, and the groove depth in the tapered portion is gradually reduced toward the both side edges.

7. The manufacturing method of the rubber member for the tire according to claim 1, further comprising a groove-forming step in which a strip base body extruded in a final cross sectional shape is allowed to pass between a patterning roller provided on an outer peripheral surface thereof with a groove-forming rib for forming the air-vent groove in a projecting manner, and a smoothening roller having a smooth outer peripheral surface, wherein
   in the groove-forming step, a rubber is pushed and deformed due to the groove-forming rib being pushed into the strip base body, and a part of the push-in deformation is restored thereafter, so that air-vent grooves are formed on both surfaces of the strip base body substantially at the same positions at a time.

8. A pneumatic tire wherein a raw tire using the rubber member for the tire obtained by the manufacturing method according to claim 1 is vulcanized and formed.

* * * * *